United States Patent [19]

Rosek

[11] Patent Number: 5,201,859
[45] Date of Patent: Apr. 13, 1993

[54] VERTICAL RETRIEVE SPINNER DEVICE

[76] Inventor: William A. Rosek, Rte. 4, Box 244, Waverly, Va. 23890

[21] Appl. No.: 848,774

[22] Filed: Mar. 10, 1992

[51] Int. Cl.[5] .............................................. A01K 85/00
[52] U.S. Cl. ................................. 43/42.19; 43/42.11; 43/42.2
[58] Field of Search .................. 43/12.11, 42.12, 42.13, 43/42.19, 42.18, 42.15, 42.14, 42.16, 42.17, 42.2, 42.09, 42.28, 42.36

[56] References Cited

U.S. PATENT DOCUMENTS

| | | | |
|---|---|---|---|
| 1,033,281 | 7/1912 | Skvor et al. | 43/42.28 |
| 1,395,533 | 11/1921 | Tuttle | 43/42.2 |
| 1,454,820 | 5/1923 | Readle | 43/42.09 |
| 1,754,567 | 4/1930 | Newell | 43/42.28 |
| 1,758,344 | 5/1930 | Wright et al. | 43/42.2 |
| 2,610,429 | 9/1952 | Thomas | |
| 2,653,408 | 9/1953 | Bradley | 43/42.28 |
| 2,926,451 | 3/1960 | Leba | |
| 3,555,717 | 1/1971 | Gautsche, Jr. | 43/42.19 |
| 3,750,325 | 8/1973 | Feltman | |
| 3,766,682 | 10/1973 | Majdak | |
| 4,447,980 | 5/1984 | Bassett | 43/42.14 |
| 4,831,768 | 5/1989 | Sorace | 43/42.09 |
| 5,076,005 | 12/1991 | Rosek | 43/42.19 |

Primary Examiner—Richard K. Seidel
Assistant Examiner—Chuck Y. Mah

[57] ABSTRACT

An improved vertical retrieve spinner device (10) comprising a spinner member (20) a pair of spherical bearing members (30) and (31) and a weight member (40) threadedly received in an axial manner and rotatably disposed on the intermediate portion of a primary wire support unit (11) having an eyelet member (18) formed on one end and a looped snap member (19) formed on the other end, such that the spinner member (20) will rotate freely relative to the wire support unit (11) when the spinner device (10) moves through the water in a vertical orientation.

2 Claims, 1 Drawing Sheet

VERTICAL RETRIEVE SPINNER DEVICE

TECHNICAL FIELD

The present invention relates to the field of fishing lures in general, and in particular to a spinner blade arrangement that permits the spinner blade to rotate in virtually all orientations, but particularly in the vertical plane.

BACKGROUND ART

This invention is an improvement on the subject matter of my co pending patent application Ser. No. 07/607,394 filed on Oct. 31, 1990 and entitled Vertical Retrieve Spinner Device now U.S. Pat. No. 5,076,005 which issued on Dec. 31, 1991.

As can be seen by reference to the following U.S. Pat. Nos. 3,750,325; 2,610,429; 2,926,451; and 3,766,682; the prior art is replete with myriad and diverse spinner blade arrangements used to entice fish to strike at a fishing lure.

While all of the aforementioned prior art constructions are more than adequate for the basic purpose and function for which they have been specifically designed, these patented constructions have been uniformly deficient in their failure to recognize the fact that there are many instances wherein a fisherman desires to have the spinner blade rotating in a generally vertical plane, as opposed to the substantially horizontal plane that activates virtually all spinner blade constructions when the lure is being retrieved over open water.

Examples of situations when vertical plane rotations of the spinner blade would be desirable include, but are not limited to, ice fishing, jigging over brush piles and along drop-offs and ledges, as well as during the countdown method of fishing; wherein, the cast lure is allowed to sink for a predetermined period of time to reach a certain depth before the lure is retrieved in the normal manner along a generally horizontal plane.

As a consequence of the foregoing situation, there has existed a longstanding need among fishermen for a spinner arrangement that is specifically designed to produce rotation of the spinner element as the arrangement either sinks downwardly, or is retrieved upwardly in a generally vertical plane, while the attached lure body remains in a generally vertical disposition, and the provision of such a construction is a stated objective of the present invention.

DISCLOSURE OF THE INVENTION

Briefly stated, the vertical retrieve spinner device that forms the basis of the present invention is designed to operate primarily in the vertical retrieve mode; however, it will operate equally well in the more conventional horizontal retrieve mode as well.

In order to accomplish this objective a wire unit is loosely and threadably engaged with the other components of the lure body such that the wire unit acts as an internal bearing for the other components of the lure.

The vertical retrieve spinner device comprises in general, a primary wire unit, a spinner blade unit, a plurality of auxiliary bearing units, and a weight unit.

As will be explained in greater detail further on in the specification, the structural components that comprise the spinner device are arranged in such a manner that they are particularly well suited to impart rotary movement to the spinner blade unit when the device is attached to a fishing lure and moved up and down in a generally vertical plane.

BRIEF DESCRIPTION OF THE DRAWINGS

These and other attributes of the invention will become more clear upon a thorough study of the following description of the best mode for carrying out the invention, particularly when reviewed in conjunction the drawings, wherein.

BEST MODE FOR CARRYING OUT THE INVENTION

Figure 1:
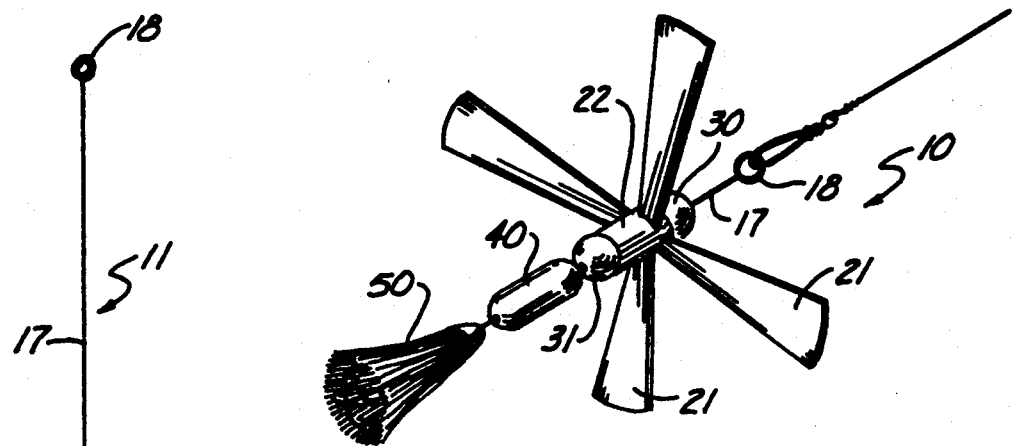
FIG. 1 is a perspective view of the vertical retrieve spinner device.

As can be seen by reference to the drawings, and in particular to FIG. 1, the vertical retrieve spinner device that forms the basis of the present invention is designated generally by the reference numeral (10). The device (10) comprises a primary wire support unit (11), a spinner unit (12), a plurality of bearing units (13) and (14), a weighted unit (15) and an auxiliary attractor unit (16). These units will now be described in seriatim fashion.

Figure 2:
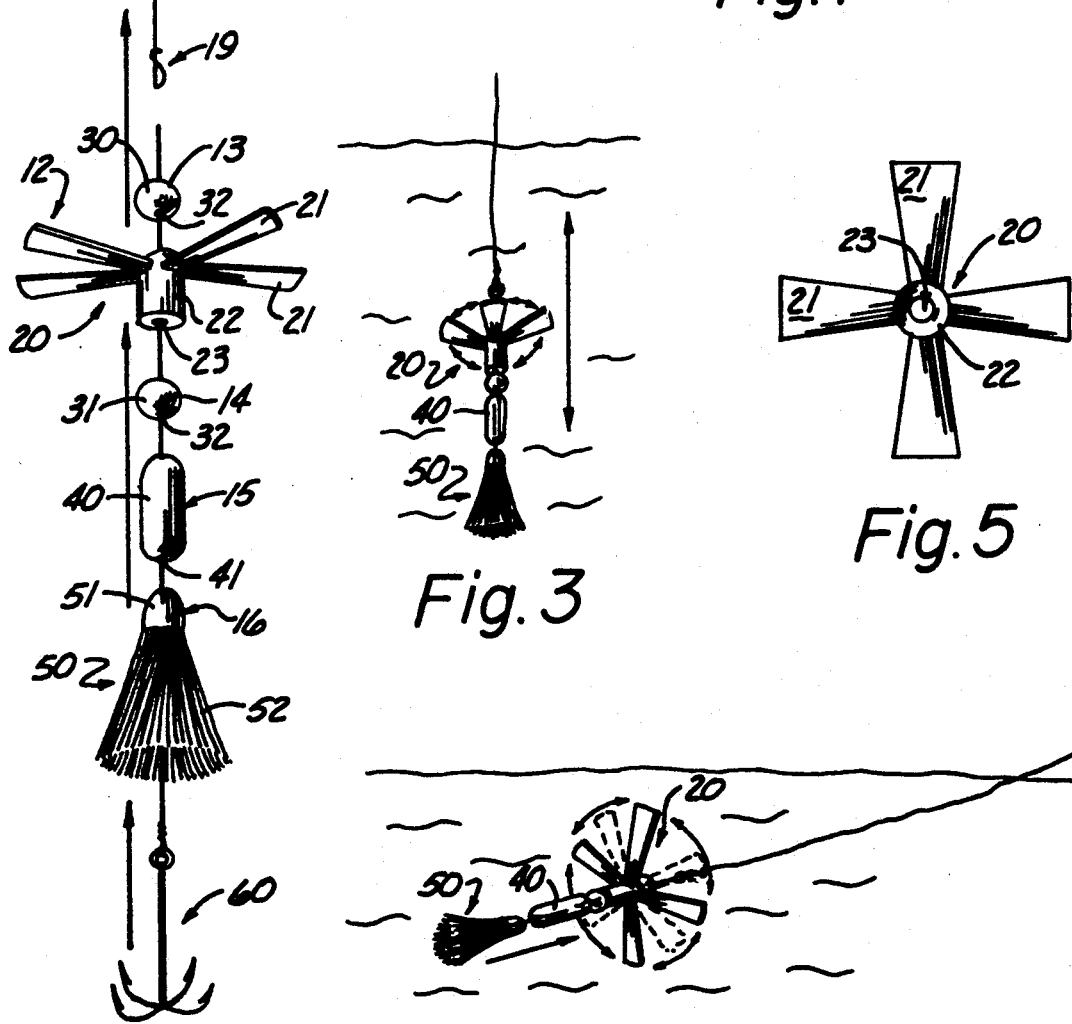
FIG. 2 is an exploded perspective view of the spinner device.

As can best be seen by reference to FIGS. 1 and 2, the primary wire support unit (11) comprises an elongated strand of wire (17) having an eyelet member (18) formed on its upper end and a looped snap member (19) formed on its lower end; wherein, the snap member (19) is formed only after the other structural components of the spinner device (10) have been threaded onto the intermediate portion of the wire strand (17).

Still referring to FIGS. 1 and 2, it can be seen that the spinner unit (12) comprises a generally rigid multibladed spinner member (20) having a plurality of spinner blades (21) radially disposed around a generally elongated and integrally formed axle element (22) provided with an enlarged central aperture (23) that is dimensioned to receive the elongated strand of wire (17) in a well recognized fashion.

Figure 5:
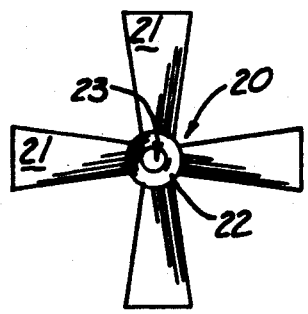
FIG. 5 is a top plan view of the spinner blade unit.

As shown in FIGS. 2 and 5, the axle element (22) of the preferred embodiment is formed integrally with, and depends downwardly from the spinner member (20).

Referring back to FIG. 2, it can be seen that the bearing units (13) and (14) comprise a pair of spherical bearing members (30, 31) provided with discrete central apertures (32) which are likewise dimensioned to receive the intermediate portion of the strand of wire (17); wherein, one of the spherical bearing members (30) rests on top of the spinner member (20); and, the other of the spherical bearing members (31) rests on the bottom of the axle element (22).

As can also be seen by reference to FIGS. 1 and 2 the weighted unit (15) comprises an elongated generally elliptical weight (40) having upper and lower rounded ends and an elongated axial aperture (41) which is also dimensioned to receive the strand of wire (17) as described previously.

In addition the auxiliary attractor unit (16) comprises an attractor member (50) comprising a cap element (51) that is threadably received by the strand of wire (17);

wherein, the periphery of the cap element (51) is further provided with a fringed skirt element (52).

As can best be appreciated by reference to FIG. 2, the strand of wire (17) is threaded through the spinner unit (12) the bearing units (13) and (14), the weighted unit (15) and optionally the auxiliary skirt unit (16); whereupon, the lower end of the strand of wire is formed into a looped snap member (19) which will captively engage the other aforementioned units intermediate the eyelet member (18) and the snap member (19) in a well recognized fashion.

In addition, the snap member (19) is dimensioned to releasably receive a conventional fishing hook (60) in an equally well recognized manner to complete the assembly of the device.

Figure 3:
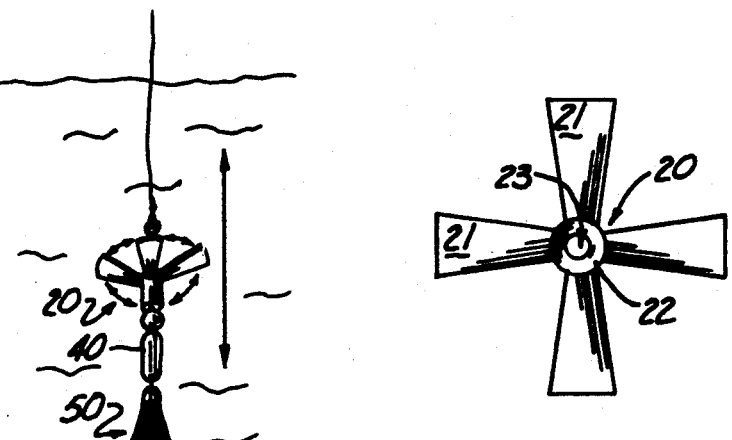
FIG. 3 is a view of the spinner device being deployed in the vertical plane.
Figure 4:
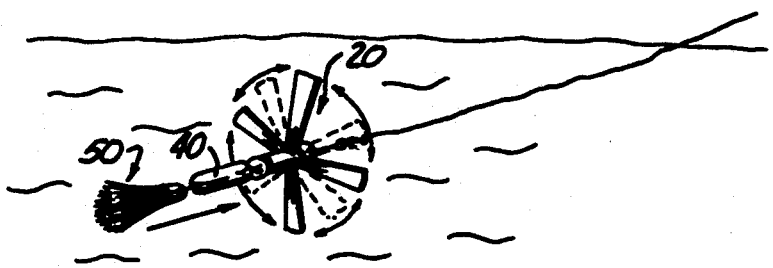
FIG. 4 is a view of the device being deployed in the horizontal plane.

As shown in FIGS. 1 and 2 the spinner member (20) is dimensioned to loosely receive the strand of wire (17) so as to freely rotate around the axially disposed strand of wire (17) regardless of whether the device is being retrieved in either the vertical mode as depicted in FIG. 3, or in the generally horizontal mode as shown in FIG. 4.

In addition, the bearing units (13) and (14) as well as the weighted unit (15) and the optional auxiliary skirt unit (16) are also rotatable to lesser degrees relative to the primary wire support unit (11); and, the weighted unit (15) is specifically provided to orient the spinner device (10) in a vertical disposition which is the preferred orientation of the device.

Having thereby described the subject matter of the present invention, it should be apparent that many substitutions, modifications and variations of the present invention are possible in light of the above teachings. It is therefore to be understood that the invention as taught and described herein is only to be limited to the extent of the breadth and scope of the appended claims.

I claim:

1. An improved vertical retrieve spinner device forming a fishing lure; wherein, the spinner device consists of:
   a spinner unit including a multi-bladed spinner member having a plurality of rigid spinner blades radially disposed around an integrally formed axle element provided with an enlarged central aperture;
   a pair of bearing units disposed on the top and bottom of the spinner unit and comprising spherical bearing members provided with central apertures;
   an elongated weight member having rounded ends and an elongated axial aperture; wherein, the upper end of the weight member is disposed beneath the lower one of the spherical bearing members;
   a primary wire support unit including an elongated strand of wire having an intermediate portion which is dimensioned to be received in said apertures; wherein the upper end of said strand of wire is provided with an eyelet member and the lower end of said strand of wire is formed into a looped snap member; and,
   a fish hook equipped with an eyelet dimensioned to be releasably received by said looped snap member; and, an attractor unit disposed intermediate the lower end of the weight member and the looped snap member.

2. The device as in claim 1; wherein, the attractor unit comprises
   a cap element having an aperture dimensioned to receive said strand of wire; wherein, the periphery of the cap element is provided with a skirt element.

* * * * *